United States Patent [19]
Scheurich

[11] Patent Number: 5,721,934
[45] Date of Patent: Feb. 24, 1998

[54] RETROFIT EXTERNAL POWER SAVING SYSTEM AND METHOD FOR USE

[75] Inventor: Christoph E. Scheurich, Santa Cruz, Calif.

[73] Assignee: Intel Corporation, Santa Clara, Calif.

[21] Appl. No.: 790,275

[22] Filed: Jan. 28, 1997

Related U.S. Application Data

[63] Continuation of Ser. No. 268,032, Jun. 29, 1994, abandoned.
[51] Int. Cl.$^6$ .................... G06F 1/32; G06F 1/24
[52] U.S. Cl. .................... 395/750; 395/827; 395/838; 395/652
[58] Field of Search ............... 395/750, 827, 395/838, 652; 379/102

[56] References Cited

U.S. PATENT DOCUMENTS

| | | | |
|---|---|---|---|
| 4,317,181 | 2/1982 | Teza et al. | |
| 4,545,030 | 10/1985 | Kitchin. | |
| 4,758,945 | 7/1988 | Remedi. | |
| 4,851,987 | 7/1989 | Day. | |
| 4,980,836 | 12/1990 | Carter et al. | |
| 5,148,380 | 9/1992 | Lin et al. | |
| 5,167,024 | 11/1992 | Smith et al. | 395/375 |
| 5,175,845 | 12/1992 | Little | 395/550 |
| 5,189,647 | 2/1993 | Suzuki et al. | |
| 5,239,575 | 8/1993 | White et al. | 379/107 |
| 5,291,302 | 3/1994 | Gordon et al. | 358/400 |
| 5,291,542 | 3/1994 | Kivari et al. | |
| 5,359,540 | 10/1994 | Ortiz | 364/492 |
| 5,369,771 | 11/1994 | Gettel. | |
| 5,477,476 | 12/1995 | Schanin et al. | 364/207 |
| 5,481,733 | 1/1996 | Douglis et al. | 395/750 |
| 5,493,105 | 2/1996 | Desai | 235/375 |

Primary Examiner—Jack B. Harvey
Assistant Examiner—Jeffrey K. Seto
Attorney, Agent, or Firm—Blakely, Sokoloff, Taylor & Zafman

[57] ABSTRACT

An intelligent power strip circuit for providing automatic computer system power down features and for providing automatic restoration of power for the computer system. The intelligent power strip circuit may be used by conventional computer systems that do not have internal power management features to retrofit them to provide power conservation modes. The circuit is responsive to an incoming phone call and will provide automatic power on and system initialization to enable the computer system to respond to a call. The circuit is responsive to the keyboard, mouse, and other user interface devices (for automatic power up and conditional timed power off) because these devices are routed through the external circuit to the computer system. Peripherals and the CPU chassis of the computer system receive their AC power via the circuit and therefore may be automatically powered down under control of the CPU when appropriate. Programming logic operable on the computer system controls aspects of the power strip circuit. The circuit provides automatic power up features. The intelligent power strip is advantageously suited to provide power management features to conventional computer systems that were implemented before such features were widely available and internally installed. The circuit therefore provides power savings to a large number of computer systems.

12 Claims, 5 Drawing Sheets

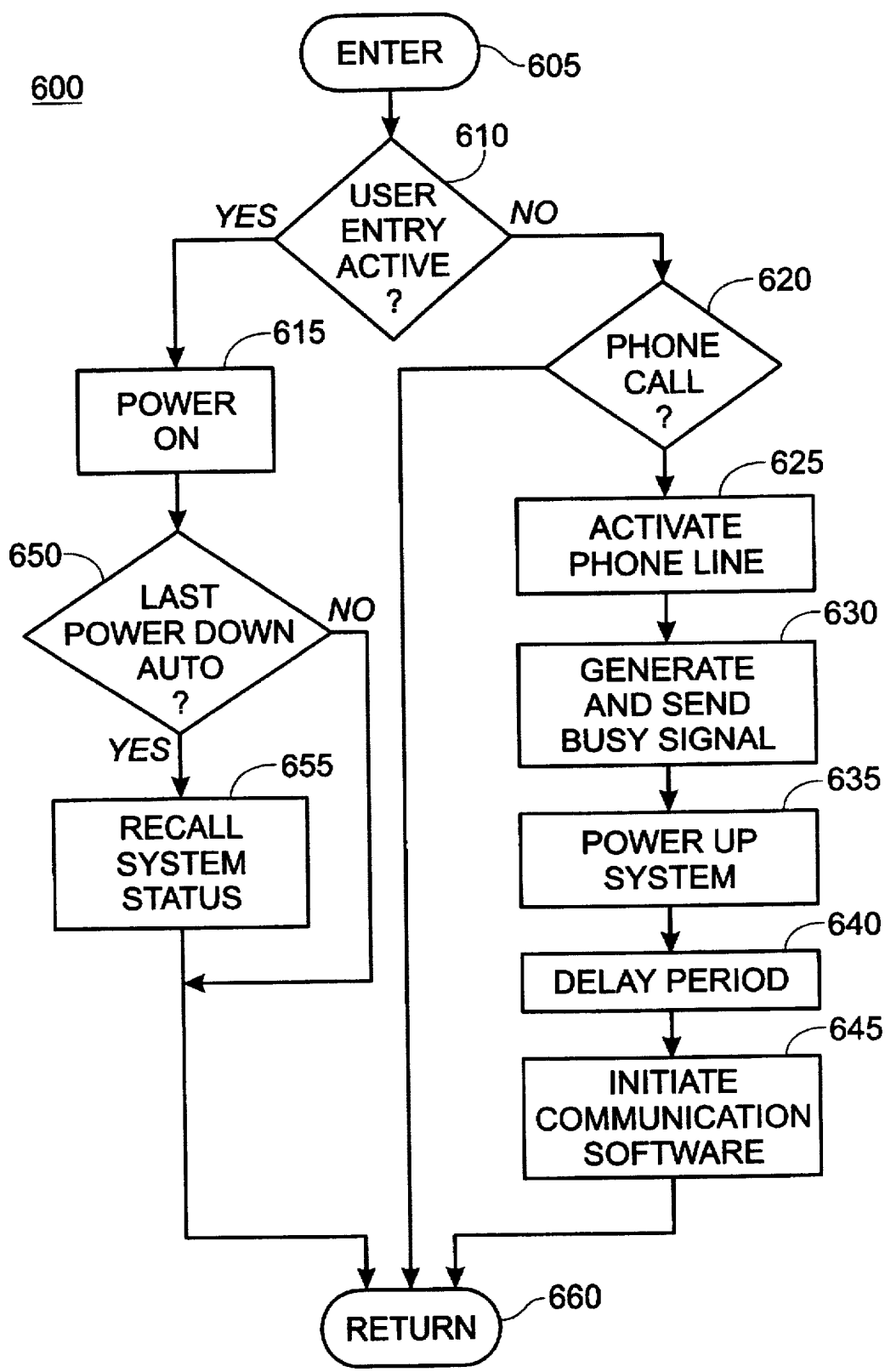

RETROFIT EXTERNAL POWER SAVING SYSTEM AND METHOD FOR USE

This is a continuation of application Ser. No. 08/268,032, filed Jun. 29, 1994 now abandoned.

BACKGROUND OF THE INVENTION

(1) Field of the Invention

The present invention relates to the field of power conservation within a computer system. Specifically, the present invention relates to the field of retrofitting conventional computer systems with power management features.

(2) Prior Art

The issue of power management and power conservation became important for computer systems, e.g., laptop systems, portables, and desktops, among others. As is known, the issue of power management is critical for portable computer systems that are battery operated because the energy storage within the battery is limited and power conservation therefore extends the usable working period of the portable computer system between recharging. However, power management is also important for desktop computer systems for energy conservation.

Desktop computer systems consume an appreciable amount of power during operation. This is true not only for the computer chassis (e.g., motherboard unit) but also for the associated peripherals, including an energy consuming display, printer, disk drive, and other devices such as a CD-ROM unit and add on cards and boards that may be plugged into the computer chassis. Often these computer systems are left operable and fully powered even during periods when they are not used and not intended to be used. This situation is often the case at the workplace where computer systems may be left powered on around the clock but are used only during the work hours.

Desktop computer systems, assuming a workplace environment, can be expected to be left powered on approximately 14 hours each work day and 48 hours each weekend, although they are not intended to be used during this period. A conservative estimate of the power consumption for a computer system is 180 watts. Therefore, powering down these computer systems during periods of no use can save at least 21.25 kilowatt hours per week or 1,104 kilowatt hours each year for each machine. At current rates, this would save approximately $110 each year for each computer system. The above analysis neglects effects of heat production by the computer system which increases the demand on air conditioning systems and adds to the cost overall. Therefore, the actual energy and cost savings that can be expected via power management is actually greater. Since energy conservation is advocated and encouraged by the Department of Energy and similarly since the computer industry has responded by attempting to provide power conservation features for newly designed computer systems, there is a great need and demand for power saving features that can be implemented to reduce power consumption of computer systems.

Some prior art circuits and method for reducing power consumption within modern computer system are implemented internal to the computer system (e.g., within the central chassis). In effect, these systems are designed into the computer system before they are sold to the end user and are, therefore, not readily adaptable or available for computer systems that were sold and installed before the demand for power management became prevalent. One exemplary prior art computer system implemented with an internal power management circuit 15 is illustrated in FIG. 1. The system 20 typically contains a central processing unit 10, a read only memory 3, a random access memory 3, a video display output and controller 5 as well as other peripheral devices (7a–7z). These units are coupled to communicate with an address/data bus 12. An internal power management unit 15 is coupled to address/data bus 12 and may perform a number of features to monitor some system activity or peripheral access. Internal unit 15 also may contain, aside from system activity monitors, idle or sleep timers and power management protocol to take action upon the detection of an idle system and for waking the system upon the detection of system use. As shown, the CPU 10, portions of RAM 2, portions of ROM 3, portions of the bus 12 and the power management circuitry 15 are located within the internal circuitry 17 of the computer. Therefore the power management circuitry 17 is very system specific. This circuitry 17 usually resides within a motherboard or chassis of the computer and the other peripheral devices are then coupled thereto. This device is often called an internal power management unit.

One such internal power management circuit 15 implemented within relatively newer computer systems involves monitoring system events and placing the computer system into a standby or suspend mode after a predetermined period of time elapses with no system activity. Another type of prior art internal circuit 15 monitors address lines associated with peripheral access to determine system activity and will take some type of power management action upon the expiration of a timer. These internal power management circuits, while effective to some degree or another for their associated installed computer system, offer little advantage for the computer system that was designed and installed before these internal circuits became available and popular (e.g., "conventional computer systems"). Conventional computer systems, as this term is used herein, do not contain system activity internal monitors nor internal power management timing circuits nor internal power management activity protocols or power up and power down circuits. What is needed, therefore, is a power management system that can be readily adapted to conventional computer systems and offer advanced features not otherwise available to these conventional computer systems. The present invention provides such advantageous features.

Accordingly, it is an object of the present invention to provide power management and power conservation features in a circuit and procedure that is readily adaptable to any computer system. Further, it is an object of the present invention to provide such features for conventional computer systems that were designed and installed before internal and specialized power management circuits become prevalent. To this end, it is yet another feature of the present invention to readily retrofit conventional computer systems with advanced power management capabilities. It is another object of the present invention to provide the above power management system in a device that is easily installed by the end user to any existing computer system. It is another object of the present invention to provide power conservation features in a device that is responsive to an incoming telephone line. These and other features of the present invention not specifically mentioned above will become clear upon further discussions of the present invention herein.

SUMMARY OF THE INVENTION

An intelligent power strip circuit for providing automatic computer system power down features and for providing automatic restoration of power for the computer system. The intelligent power strip circuit may be used by conventional computer systems that do not have internal power management features to retrofit them to provide power conservation modes. The circuit is responsive to an incoming phone call and will provide automatic power on and system initialization to enable the computer system to respond to a call request. The circuit is responsive to the keyboard, mouse, and other user interface devices (for automatic power up and conditional timed power off) because these devices are routed through the external circuit to the computer system. Peripherals and the CPU chassis of the computer system receive their AC power via the circuit and therefore may be automatically powered down under control of the CPU when appropriate. Programming logic operable on the computer system controls some aspects of the power strip circuit. The circuit provides automatic power on features. The intelligent power strip is advantageously suited to provide power management features to conventional computer systems that were implemented before such features were widely available and internally installed. The circuit therefore provides power savings to a large number of computer systems.

Specifically, embodiments of the present invention include in a computer system including a central chassis coupled to a user interface and a plurality of peripherals coupled to communicate with the central chassis, a power management system including: system activity monitor logic operable within the central chassis for determining system idle time and for generating an automatic power down signal indicating that the system idle time exceeds a predetermined duration; and external power management circuitry coupled to communicate with the central chassis, the external power management circuitry comprising: a plurality of sockets for supplying power to peripherals of the plurality of peripherals and for supplying power to the central chassis; a power on detection circuit coupled to the user interface device and coupled to a communication line, the power on detection circuit for generating a power on signal responsive to activity over the user interface and also responsive to a communication request over the communication line; a switch circuit for selectively providing power to the plurality of sockets, the switch circuit for providing power to the plurality of sockets in response to the power on signal; and a power off circuitry responsive to the automatic power down signal for causing the switch circuit to disconnect power from the plurality of sockets.

Embodiments of the present invention include the above and wherein the external power management circuitry further comprises a busy tone generation circuit responsive to the power on detection circuit for temporarily generating a busy tone over the communication line and further comprising communication logic operable within the central chassis for providing access to the computer system over the communication line, the communication logic initiated in response to the power on signal. Embodiments include the above and further including saving logic for saving system information in advance of automatically powering down the computer system, the saving logic operable within the central chassis and responsive to the automatic power down signal and further comprising restoration logic operable within the central chassis for restoring the system information responsive to the external power on circuitry providing power to the plurality of sockets. Embodiments include the above and further including: logic for providing an allowable shut down timing window; and logic for preventing generation of the automatic power down signal if the system idle time exceeds the predetermined duration at a time outside of the allowable shut down timing window.

The present invention also includes a method implemented in accordance with the above.

BRIEF DESCRIPTION OF THE DRAWINGS

FIG. 7 is a flow diagram illustrating automatic power and system restoration of the present invention power management system.

DETAILED DESCRIPTION OF THE INVENTION

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

The preferred embodiment of the present invention consists of an intelligent power strip and external circuitry along with power management procedures that operate on a computer system. The external power strip circuitry and power management procedures operate together, within the scope of the present invention, to provide a readily installable power management system for conventional computer systems. The power management system may be implemented on a general purpose computer system to provide that computer system with power management features. When used and integrated within a conventional computer system, the present invention will retrofit the conventional computer with automatic power management features.

Figure 4:
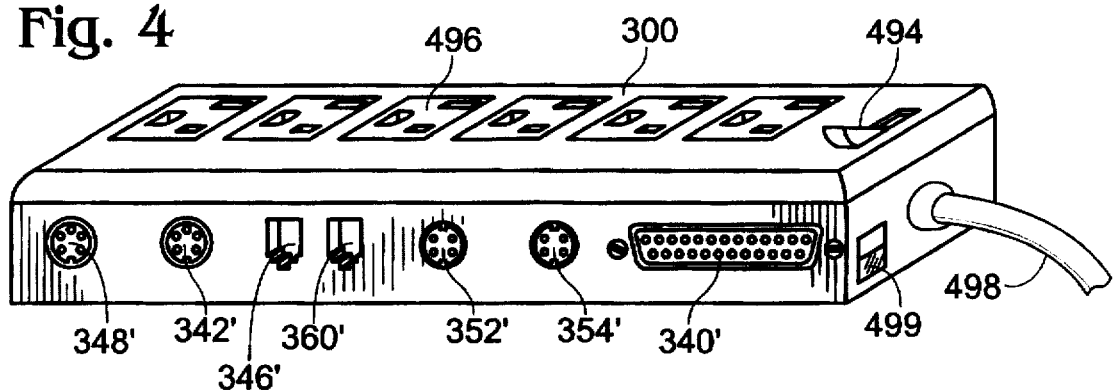
FIG. 4 is a perspective view of one exemplary implementation of the intelligent power strip of the present invention.

In general, circuitry of the present invention is housed in an intelligent power strip through which peripherals and the computer chassis receive power from an AC power outlet, or its equivalent (see FIG. 4). The intelligent power strip also receives the keyboard, mouse and telephone line inputs and channels these inputs back to the computer chassis. The circuitry of the present invention intelligent power strip is coupled to communicate with the computer chassis via a serial line to one of the serial ports of the computer. Program procedures of the present invention are loaded into the computer system and operate as a memory resident program that will execute periodically to perform the automatic power management tasks (in conjunction with the intelligent power strip) as will be further described to follow. Programs of this nature are often referred to as terminate and stay resident (TSR) or extensions. The present invention provides automatic power down and system status storage and also provides automatic power and system restoration. The present invention is also responsive to an incoming telephone line and provides automatic system restoration in response thereto. A busy signal is generated in response, if the system is powered down, to induce a retry call. The required circuit and software are readily adaptable to many computer systems can be installed easily by the end user without technical expertise.

Figure 1:
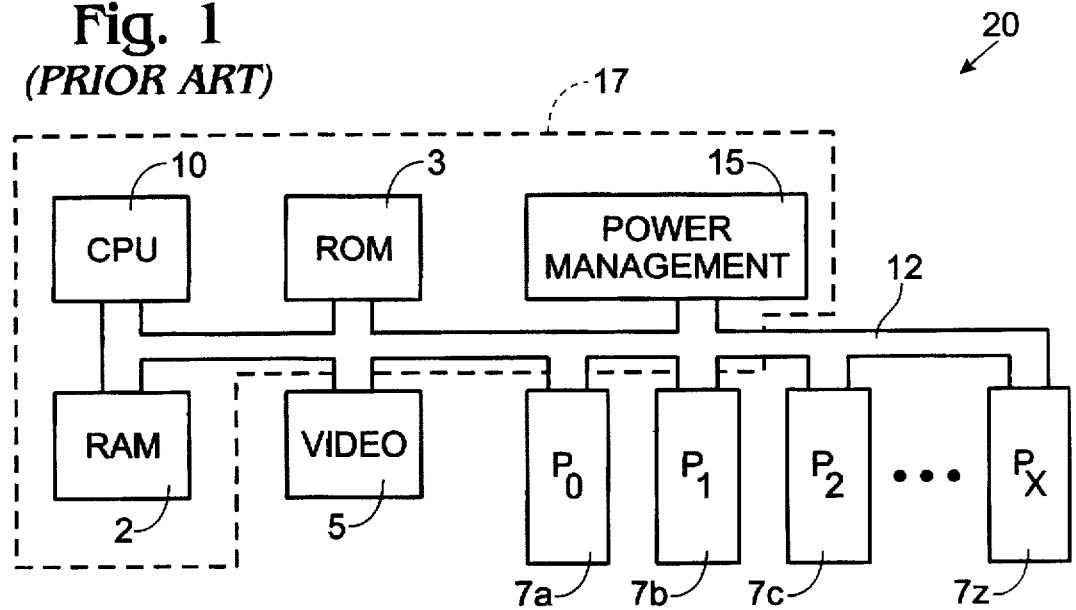
FIG. 1 is an illustration of a internal power management circuit implemented within a general computer system including peripheral devices.
Figure 2:
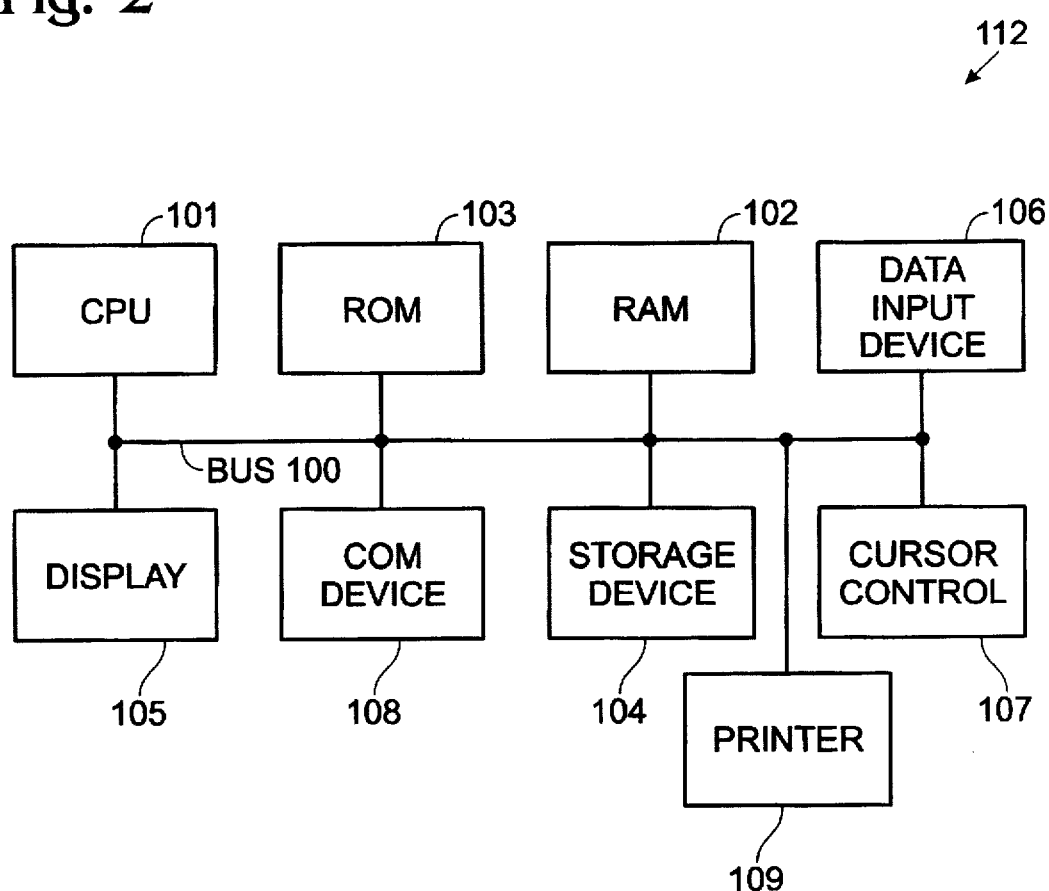
FIG. 2 illustrates components of a general computer system that may be implemented to operate procedures of the present invention power management system.

Refer to FIG. 2 which illustrates components of a general purpose computer system 112 that are capable of executing power management procedures of the present invention that are implemented within a computer system that is coupled to the intelligent power strip circuitry of the present invention. The computer system comprises an address/data bus 100 for communicating information within the system, a central processor 101 coupled with the bus 100 for executing instructions and processing information, a random access memory 102 coupled with the bus 100 for storing information and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device ("communication device")108 coupled to the bus 100 for communicating command selections to the processor 101.

The signal generation device 108 includes a standard RS 232 or similar serial port for communicating with peripherals and for communicating with the intelligent power strip circuit of the present invention. Device 108 also includes a telephone line input. As will be shown below, the keyboard 106, the cursor control device 107 and the telephone line of device 108 are actually coupled to the computer system 112 via the intelligent power strip of the present invention. A computer or central "chassis" refers to circuitry that may include at least the CPU 101, address/data bus 100, a portion of ROM 103, and a portion of RAM 102. Alternatively, in some systems the chassis may also include, but not necessarily, the storage device 104 (optionally) and aspects of the communication device 108 (optionally). A hardcopy device or printer 109 may also be optionally attached.

The display device 105 of FIG. 2 utilized with the computer system 112 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, finger pad, mouse, joystick or special keys on the alphanumeric input device 105 capable of signaling movement of a given direction or manner of displacement.

Figure 3:
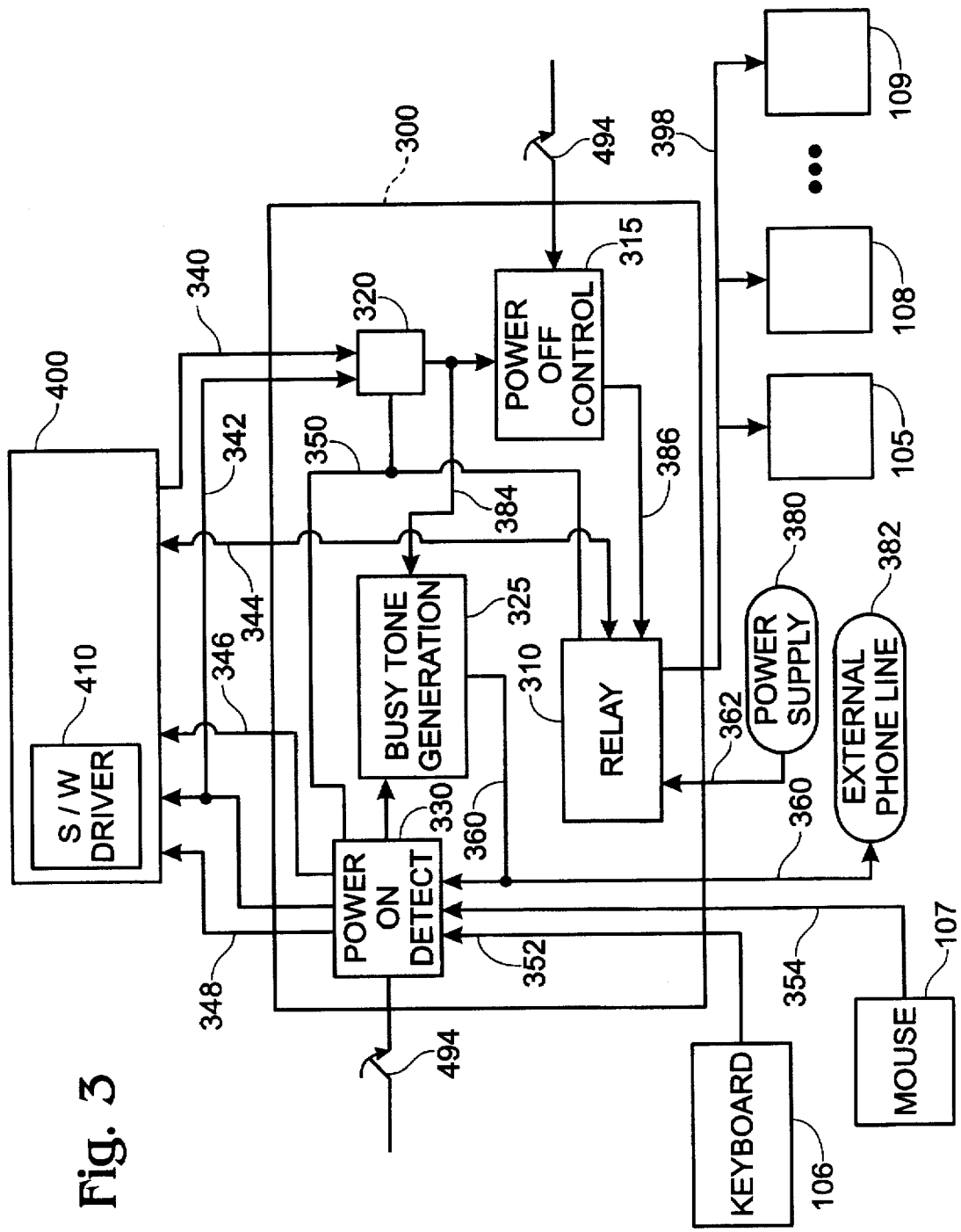
FIG. 3 is a block diagram of the circuitry of the intelligent power strip embodiment of present invention power management system coupled with elements of a computer system.

Refer to FIG. 3 which illustrates the power management system of the present invention including the features located within (1) driver procedures executed on the computer chassis 400 and (2) within the intelligent power strip circuitry 300 of the present invention. As shown, the computer chassis 400 contains software drivers 410 that are terminate and stay resident software procedures (TSR). On a cyclic basis, these procedures operate (e.g., based on a timer interrupt or other cyclic event) to perform system idle detection and other functions that will be described further to follow. As part of the present invention the driver 410 is installed into the computer system once when the present invention is installed into the system. Among other features, the driver 410 is able to detect a power down event and communicate a power down command over line 342 or 340 to the power strip circuit 300.

The circuitry of the intelligent power strip 300 is coupled to the computer chassis 400 via an interface as shown in FIG. 3. The interface consists of a keyboard channel 348, a mouse channel 342 and a phone line channel 346. The interface also consists of a serial line connection (e.g., RS232 or similar) 340 and a standard power cord coupling 344. Coupled into the intelligent power strip 300 is a keyboard input 352 from the keyboard unit 106 and a mouse input 354 from the mouse unit 107. It is appreciated that any number of other cursor positioning devices could optionally or additionally be utilized (such as a pen and table or a track ball, joy stick, or other cursor positioning device). Coupled to the intelligent power strip 300 is also an external phone cord 360 which is coupled to an external phone line 382 or jack. Also coupled to the intelligent power strip 300 is a power supply (e.g., 60 Hz AC power) 380 via power cord 362. As shown, various peripheral devices (display 105, communication modem 108 and printer 109) are coupled to receive power via power supply sockets of the power strip 300.

The keyboard 106 and the mouse 107 are coupled to power on detection circuit 330 via lines 352 and 354, respectively. The circuit 330 monitors the signals over the keyboard 106 and the mouse 107 and responds to signals indicating that either the keyboard or mouse is being used. If a key is pressed or if the mouse is moved, circuit 330 will detect an active system (assuming the power is on) or a possible power on condition (assuming the power is off). Power on detection circuit 330 also responds to a manual toggle switch 494 and will detect a power on condition if this toggle switch changes state and the computer system is currently powered off. Circuit 330 also receives a phone line input and circuit 330 is responsive to an incoming call and will recognize such as a power on condition. The logic for implementing circuit 330 is well known and will not be discussed herein in detail. Upon detection of a power on event, the circuit 330 generates an activation signal (automatic power on signal) over bus 350 to a communication circuit 320 and also to a relay circuit 310 which causes power to be supplied to the computer chassis 400 and all peripheral devices coupled to receive power over the power strip 300. This causes the computer system to be fully powered up. The mouse input line 354 is channeled to the computer chassis 400 via line 342. The keyboard input line 352 is channeled to the computer chassis 400 via line 348. The telephone line 382 is channeled to the computer chassis (if needed) via line 346. The telephone line 360 is also coupled to modem 108 which is coupled to the computer system chassis 400 via a serial or parallel line. Unit 108 may also be a facsimile modem ("fax modem").

The power detection circuit 330 is coupled to a busy tone generation circuit 325 that generates a busy signal that can be broadcast over the telephone line 360. Power detection circuit 330 generates a call signal to the busy tone generation circuit 325 upon the detection of an incoming call over line 360 while the computer system is powered off. This call signal causes circuit 325 to receive the incoming call and respond thereto by generating a power on busy tone. The implementation for circuit 325 is well known and will not be further described in detail. The power on detection circuit 330 also generates a signal over bus 350 to communication circuit 320 and to the relay circuit 310 causing the relay to switch closed and supply power over line 344 to the computer chassis 400 and all other peripheral devices (e.g., display 105, modem 108 and printer 109, etc.) coupled to receive power over the power strip 300. This causes the computer system to be fully powered up. The busy signal is generated provided the system was powered down upon detection of the call over line 360. The signal is generated to induce a second or retry call from the calling device. By the time the second call arrives, the system should be fully powered and initialized. If the system is already powered on after a call is detected, the busy tone circuitry will not generate a busy signal.

Communication circuit 320 of FIG. 3 is coupled to a serial line of the computer system. If responding to a power up condition caused by an incoming call, the circuit 320 transmits a command to the computer system (with appropriate delay because the computer system at this time is booting up) causing the computer system to implement a communication software package that is able to respond to an incoming call. After another delay, the communication unit 320 causes the busy tone generation circuit 325 to terminate generation of the busy tone via a termination signal generated over line 384. In the typical case, the caller procedure that initiated the incoming call, after receiving the busy signal, will try again soon after the first call. During the retry latency, the computer system will be powered up by the intelligent power strip 300 and will instruct the computer chassis 400 to execute its communications software package in order to properly receive the retry call.

The terminate and stay ready software procedure 410 operable on the computer chassis 400 is able to control the relay 310. Namely, the computer chassis 400 may communicate over the serial line 340 to the circuit 320 in order to instruct circuit 320 to power down the computer system by instructing power off controller 315 to instruct relay 310 to open its switch. When the relay 310 opens the switch, all power to devices coupled to the intelligent power strip 300 will be removed. As will be discussed below, different conditions can cause the driver 410 to enter a power down state. One of these conditions is an idle computer system detected over a certain time period. Power off controller circuit 315 also responds to a manual toggle switch 494 and will detect a power off condition if this toggle switch changes state and the computer system is currently powered on. It is appreciated that in some systems, the mouse 107 communicates to the computer chassis 400 via a serial line. In these cases, the serial line used for mouse communication 342 can also be used to couple circuit 320 to the computer chassis. This is illustrated by line 342 coupled to circuit 320. In this case, the serial line 340 is not needed and may be used for other purposes. It is appreciated that a manual override switch (not shown) may be coupled to the power off controller circuit 315 and accessible from the exterior of the power strip 300 to manually disable the automatic power down features.

Communication circuit 320 may be implemented as a state machine circuit or a controller circuit for responding to commands from the computer chassis 400 over the serial line 340 and for generating commands to the computer chassis 400. Circuit 320 contains the required logic and circuitry for receiving and generating serial communication via an RS232 standard. Such circuitry is readily available and well known. Circuit 320 also contains an on/off register that contains the current power state of the computer system. This register can be read from power on detection circuit 330, the power off controller 315, and the software driver 410 (when operable). The power off controller 315 resets this on/off register and the power on detection circuit 330 sets this on/off register.

Refer to FIG. 4 which illustrates an exterior perspective view of the intelligent power strip device 300 of the present invention. There are several outlets or sockets 496 for providing power to the computer chassis 400 and other peripheral units of the computer system. There is a manual toggle switch 494 coupled to the power on detection circuit 330 and also coupled to the power off controller 315. This switch is illuminated from below by a LED lamp and will illuminate when circuit 300 supplies power to the devices coupled to the outlets 496. Located on the power strip 300 are inputs 352' for receiving the keyboard cord 352 and input 354' for receiving the mouse input 354. Also, phone jack input 360' receives input phone line 360. Jack 346' is used to couple line 346 which couples to the computer chassis 400 (if needed). Also, output 348' couples line 348 to the computer chassis 400 for receiving keyboard signals. Output 354' couples line 354 to the computer chassis 400 for receiving mouse signals. Serial port 340' couples to serial line 340 which is coupled to the computer chassis 400 for providing a communication pathway between the communication circuit 320 of the intelligent power strip and the computer chassis 400. Cord 498 is coupled to line 362 and provides AC power to the power strip outlets when coupled to an AC source of power. A manual override switch 499, when set, disables power management features and power strip 300 will act as a conventional power supply strip.

As discussed above, the present invention provides for certain external power management circuits, namely the circuits of power strip 300, for providing power management for a computer system. The computer system, generally, is composed of the peripheral devices that may be coupled to receive power from the power strip sockets 496 and also include the computer chassis 400 which also receives power from the power strip 300. Since the power management circuitry is external, it may be coupled to a number of existing computer systems with relatively little difficulty. Software drivers 410 installed to operate within the computer chassis 400 are also an element of the power management system of the present invention. The discussions below illustrate the operation of the circuitry and software as discussed above.

Figure 5:
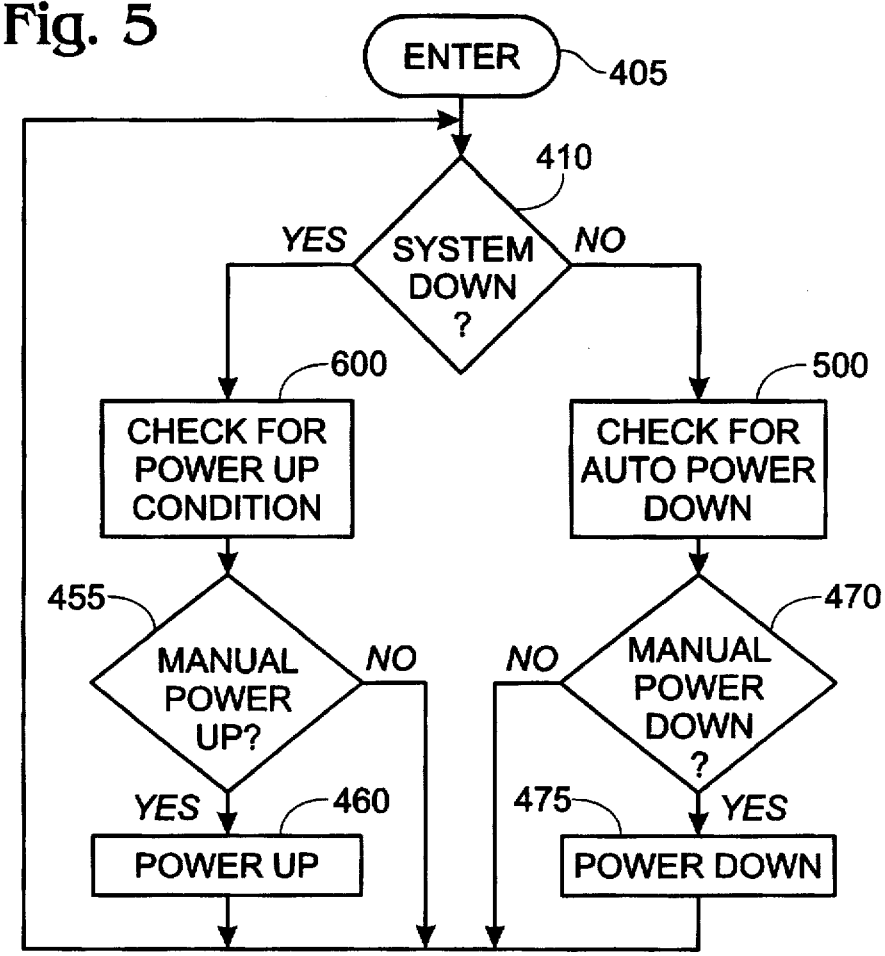
FIG. 5 is a flow diagram illustrating processing tasks performed by the present invention power management system.

FIG. 5 illustrates an overall flow diagram of processing tasks performed by the power management system of the present invention. It is appreciated that certain tasks as will be described to follow may be implemented in software within the power management driver 410 (as shown in FIG. 3) and other tasks may be implemented in hardware or within the intelligent power strip circuit 300 of the present invention. Of course, those power management steps of the present invention operable when the computer system is powered down are not performed in software. In certain instances, steps may be implemented in either location and such selection is one merely of design choice and therefore either implementation should be considered within the scope of the present invention.

The processing flow of FIG. 5 enters at block 405 and at block 410 the intelligent power strip tests the computer system to determine whether or not the power is on or off. The on/off register stored within the communication circuit 320 (see FIG. 3) is set when the system is energized and reset when the power is shut off. If the power is currently available, then at block 500 the present invention performs automatic power down processing. Block 500 is described in more detail with reference to FIG. 6. Referring to FIG. 5, if an automatic power down is in order then within block 500, the driver 410 will instruct the intelligent power strip 300 to power off the computer system. At block 470, the present invention checks toggle switch 494 to determine if a manual power down operation is required. If the computer system is currently powered up and the toggle switch 494 changes state, then the computer system should be powered down. At block 470, the intelligent power strip 300 detects the manual switch 494 and at block 475 the power off controller 315 instructs the relay 310 to cut power from the outlets 496. Illumination of the toggle switch 494 is turned off. Processing then flows to block 410. When power is cut as a result of a manual switch, the computer system does not perform any status storage operations. When power is cut, the on/off register of the communication circuit 320 is reset by the needer off controller 315. If no manual power down is needed at block 470, then processing returns to block 410.

If the computer system is powered up, the processing flows from block 410 to block 600. At block 600 the computer system checks if there is an automatic power up condition. Generally, automatic power up conditions include an input from the keyboard, a movement of the cursor generation device (e.g., mouse) or an input call from the external telephone line. If an automatic power up event is detected by the intelligent power strip 300, the computer system will be supplied with power according to the procedure of block 600 (see FIG. 7) and return to block 455. At block 455, the present invention determines if the toggle switch 494 indicates that a manual power on condition is required. If no manual power on mode is desired, then processing flows to block 410. If the power is off, as indicated by the on/off register, and the toggle switch 494 changes state, then at block 455 the present invention intelligent power strip enters block 460 wherein power is supplied to the computer chassis 400 and other peripherals coupled to the outlets 496. Also, the on/off register of the communication circuit 320 is set by the power on circuit 330. After block 460, processing flows to block 410.

The above procedure, generally, is performed by the power management system of the present invention to provide a computer system with power management capabilities. The below discussions illustrate in more detail the automatic power up and power down features and aspects of the present invention.

Figure 6:
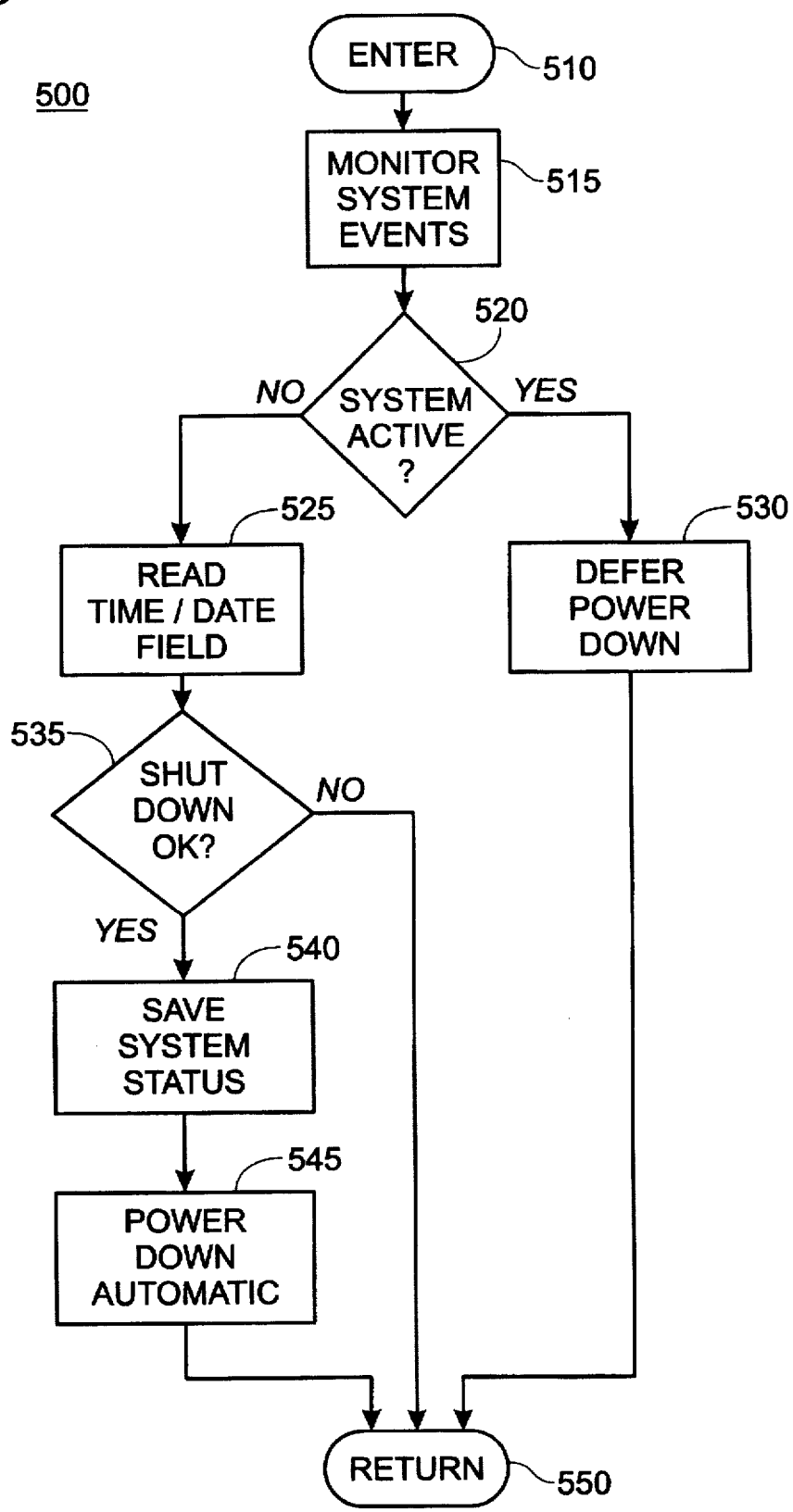
FIG. 6 is a flow diagram illustrating automatic power down processing tasks performed by the present invention power management system.

Block 500 of FIG. 6 represents the automatic power down features of the present invention. The processing enters at block 510 and at block 515 the device driver 410 monitors system events to determine if there is an active system. If the manual override switch 499 is set, then block 500 is exited without any power management performed. The system events, monitored correspond to the events generated by a computer system that is actively engaged in processing or receiving or transmitting a message. There are a number of different well known methods that can be used for monitoring an active system and these can be used within the scope of the present invention. There are a set of events monitored by IBM compatible systems for entry into a Global Standby mode and these events, for IBM compatible systems, may be monitored at block 515. Interrupt generation can also be monitored because many peripheral devices, when active, generate interrupt signals. Further, the modem or serial ports can be monitored to determine system activity. Also, signals from peripheral device controllers may be monitored to determine system activity. Of course, the input of information from the keyboard and/or the mouse can be monitored to determine system activity. Certain systems behave a very characteristic way when waiting for a system prompt. This characteristic behavior may be tested and will indicate a possible system idle. For any period of inactivity, the time period for that inactivity is maintained. It is appreciated that a number of different procedures may used to determine inactivity for a period of time, e.g., the way in which a screen save operates is a typical example, and any of these well known procedures that are operable with the central chassis 400 may be used within the scope of the present invention.

At block 520, the driver 410 of the present invention determines if the system has been idle or inactive for a predetermined and programmed time. This time period (having a default) may be programmed by a set up menu accessible from the driver software 410. If the system exhibits recognized activity or the inactivity has not been long enough to surpass the programmed time period, then block 530 is entered wherein automatic power down is deferred or bypassed and the processing exists at block 550.

If there has been inactivity for a predetermined time period, at block 525 of FIG. 6, the present invention accesses a list of allowable shut down time/date ranges ("windows") from memory 102. These allowable shut down time ranges are programmable via a user interface with the driver 410. An exemplary time/date range would be set from 5 pm to 8 am during the normal work week and all day for the weekend and expected days off. During these hours, the computer system is allowed to shut down when inactive for the specified time period, otherwise the automatic shut down would be deferred or ignored. Time periods outside the allowed shut down periods are called illegal time windows and shut down requests during these illegal periods are ignored or overridden. The time periods may be set to a certain reset value which can indicate that either (1) no time is allowable for shut down or (2) any time is allowable for shut down once the inactivity as been detected for a given time period. At block 535, the present invention checks the internal clock of the computer system against the accessed time/date ranges to determine if shut down is allowable. If shut down is not allowable, then at lock 535 the processing exists at block 550.

If shut down is allowable, then at block 535 processing flows to block 540 wherein before shut down is initiated, a warning message will alert a possible user that shut down is imminent thus allowing that user the opportunity to override the shutdown procedure. If shut down is not overridden by the user, the current programs and applications open are exited properly (e.g., with save option selected) and the files are saved (e.g., to hard disk storage) concurrently. Many applications exist wherein programmed keystrokes are known for exiting the program and saving the current work file at the same time. These keystrokes may be programmed into the driver 410 by a user interface menu and if open, these applications can be exited cleanly upon automatic shut down. Other pertinent system information needed for system restoration can also be saved to hard disk storage at block 540. Also at block 540 the on/off register of the communication circuit 320 is reset. At block 540, the software driver 410 writes a special message to a dedicated place in the hard disk, or similar storage memory, indicating that the power down was automatic and not manual. This information will be used by the power restoration procedures of the present invention to determine if previously saved system information needs to be restored or not. At block 545, the driver 410 communicates to the communication circuit 320 over the serial to power down. Power down controller 315 issues a signal to the relay 310 which disconnects power to the outlets and the computer system is automatically powered down. At this point, as always when plugged in, the internal circuitry of the intelligent power strip 300 is energized with power. At power down, the illumination of the toggle switch 494 is turned off and processing returns via block 550. It is appreciated that if switch 499 is set, no power down activity is allowed.

Regarding FIG. 7, the power down processing flow 600 of the present invention enters at block 605 and at block 610 the intelligent power strip circuitry 300 checks the keyboard and the mouse for any user interaction. If a key was pressed on the keyboard unit or if the cursor control device was moved, a signal from these devices will be monitored by the power on detection circuitry 330. It is appreciated that although the computer chassis 400 is powered down by the power strip 300, the internal circuitry of the strip 300 is still energized and circuit 300, using well known circuitry, is able to monitor the mouse and the keyboard devices since both are connected thereto. If a user interaction is detected at block 610, processing flows to block 615 wherein the present invention power strip circuitry 300 provides power over the power strip to the computer chassis and to the peripheral devices coupled thereto. Therefore, block 610 is an automatic power up detection processing block.

At block 650, the present invention reads a dedicated hard drive location, or storage memory location, to determine if the last power down was automatic. If so, then at block 655 the present invention software driver 410 will reload the saved system and data information to restore the computer system similar to the state in which it was exited. Processing then returns via block 660. If the last power down was manual, then processing flows from block 650 to block 660 for return.

At block 610, if there is no user activity detected by the user interface monitor circuit 330, then processing flows to block 620 where circuit 330 checks if there is an incoming phone call over line 360. Any of a number of well known methods and circuits exist for detecting an incoming phone call and these can be used within the scope of the present invention. If there is no phone call detected, then processing of the present invention returns via block 660.

If there is a phone call detected via circuit 330, then at block 625 the present invention answers the phone line (activates the phone line) using any of a number of well known circuits. At this time a signal is generated from the power on detect circuit 330 to the busy tone generation circuit 325 and a busy tone signal is transmitted over the phone line 360 to the caller device. This busy tone is generated for a predetermined period and then will terminate or, alternatively, will continue until instructed to stop by the software driver 410. At the same time that the busy tone generation occurs, the present invention powers up the computer system including all peripheral devices and the computer chassis 400 at block 635. At block 640, the present invention delays for a period until the computer system is powered up.

In response to the busy tone reception, most caller devices will retry their call at a later time.

At block 645, the intelligent power strip 300 communicates via circuit 320 over the serial line 340 (or line 342 depending on the configuration of the mouse) in order to instruct the computer system to initiate the communication software application. The system then returns via block 660. Any of a number of communication software applications may be utilized in connection with driver software 410. These software applications are responsive to an incoming calling device and will provide for remote access to the computer system via the outside line and via the calling device. It is appreciated that at block 645, just after the communication software provides access to the computer system to the calling device, a password protection application may be initialized in order to protect against unwanted computer access. Once the computer system powers up, it may (in one embodiment) inform the busy tone generation circuit 325 to terminate and release the phone line 360.

The preferred embodiment of the present invention, an intelligent power strip circuit and system that is responsive to a user interface, controls the supply of power to the computer system and various peripherals, and is adaptable to provide conventional computer systems with power management features, is thus described. While the present invention has been described in particular embodiments, it should be appreciated that the present invention should not be construed as limited by such embodiments, but rather construed according to the below claims.

What is claimed is:

1. A power management apparatus residing external to a computer for supplying power to the computer, the power management apparatus comprising:

circuitry for turning on power to the computer upon receiving a telephone call from a calling source on a telephone line coupled to the power management apparatus;

circuitry for generating a busy telephone tone on the telephone line if power supplied to the computer by the power management apparatus was off upon receipt of the telephone call in order to inform the calling source that the power management apparatus is turning on power to the computer; and circuitry for terminating the busy telephone tone once the computer is ready to communicate with the calling source.

2. A method for performing power management for a computer coupled to an external power management apparatus, the method comprising the steps of:

generating a detection signal upon detecting a telephone call from a caller on a telephone line coupled to the power management apparatus if power supplied to the computer by the power management apparatus is turned off;

turning on power to the computer in response to the detection signal;

generating a busy telephone tone on the telephone line in response to the detection signal in order to inform the caller that the power management apparatus is turning on power to the computer and that power to the computer was previously turned off; and upon receipt of the detection signal, having the computer implement software for communicating with the caller and for terminating the generation of the busy telephone tone once the computer is ready to communicate with the caller.

3. A power management apparatus residing external to a computer for supplying power to the computer, the power management apparatus comprising:

means for generating a detection signal upon detecting a telephone call from a caller on a telephone line coupled to the power management apparatus if power supplied to the computer by the power management apparatus is turned off;

means for enabling a supply of power to the computer in response to the detection signal;

means for generating a busy telephone tone on the telephone line in response to the detection signal; and means for terminating the generation of the busy telephone tone once the computer is ready to communicate with the caller.

4. A power management apparatus suitable for use with a computer system, wherein the power management apparatus is resident external to the computer system and is coupled to the computer system with a power line and a communication line, the apparatus comprising:

a detection circuit, whereupon receiving an enabling signal from an external source, the detection circuit generates a detection signal and an activation signal;

a switching circuit, coupled to the detection circuit, to close at least one switch to provide power to the computer system via the power line in response to the detection signal, whereafter the activation signal is sent to the computer system via the communication line to initiate resident communication software; and a busy tone generator, responsive to the detection signal, to generate a busy telephone tone when the enabling signal is an incoming telephone call and the computer system is turned-off.

5. The apparatus of claim 4, wherein the enabling signal received from the external source is in response to user activity at the computer system.

6. The apparatus of claim 5, wherein the user activity involves typing on a keyboard coupled to the computer system.

7. The apparatus of claim 6, wherein the user activity involves moving of a mouse coupled to the computer system.

8. The apparatus of claim 4, further comprising a configuration save circuit to save system information in advance of automatically turning-off the computer system, in response to a power-down detection signal.

9. The apparatus of claim 8, wherein after a period of inactivity, the power-on detection circuit receives a power-down signal from the computer system and generates a power-down detection signal.

10. The apparatus of claim 8, where in response to a computer system user command, the power-on detection circuit receives a power-down signal from the computer system and generates a power-down detection signal.

11. The apparatus of claim 8, wherein after a period of inactivity, the power-on detection circuit generates a power-down detection signal.

12. The apparatus of claim 4, wherein the busy tone generator ceases the generation of the busy telephone tone once the computer system is turned-on and is ready for communication.

* * * * *

UNITED STATES PATENT AND TRADEMARK OFFICE
CERTIFICATE OF CORRECTION

PATENT NO. : 5,721,934
DATED : February 24, 1998
INVENTOR(S) : Christoph E. Scheurich It is certified that error appears in the above-identified patent and that said Letters Patent is hereby corrected as shown below:

In column 9 at line 23 delete "needer" and insert --power--

Signed and Sealed this

Twenty-third Day of June, 1998

Attest:

BRUCE LEHMAN

Attesting Officer

Commissioner of Patents and Trademarks